United States Patent [19]

Davies

[11] Patent Number: 5,089,682
[45] Date of Patent: Feb. 18, 1992

[54] ROLLER ELECTRODES FOR ELECTRIC-RESISTANCE WELDING MACHINE

[76] Inventor: Joseph R. Davies, 220 W. Haven, New Lenox, Ill. 60451

[21] Appl. No.: 424,389

[22] Filed: Oct. 20, 1989

Related U.S. Application Data

[63] Continuation-in-part of Ser. No. 173,764, Mar. 28, 1988, Pat. No. 4,940,873, which is a continuation-in-part of Ser. No. 53,375, May 22, 1987, Pat. No. 4,780,589.

[51] Int. Cl.$^5$ .............................................. B23K 11/06
[52] U.S. Cl. .......................................... 219/84; 219/64
[58] Field of Search ........................ 219/84, 81, 64, 82, 219/83, 119

[56] References Cited

U.S. PATENT DOCUMENTS

| | | | |
|---|---|---|---|
| 3,363,950 | 2/1968 | Levine et al. | 219/84 |
| 4,188,923 | 2/1980 | Kawai et al. | 219/83 |
| 4,317,704 | 3/1982 | McIntyre et al. | |
| 4,368,372 | 1/1983 | Habenicht et al. | 219/84 |
| 4,642,437 | 2/1987 | Yamamoto et al. | 219/84 |
| 4,780,589 | 10/1988 | Davies | 219/84 |
| 4,782,207 | 11/1988 | Masuda et al. | 219/84 |

FOREIGN PATENT DOCUMENTS 2805345 8/1979 Fed. Rep. of Germany.

OTHER PUBLICATIONS

Metal Publication (1955), Dr. H. Spengler.

*Primary Examiner*—Marvin M. Lateef
*Attorney, Agent, or Firm*—Charles F. Lind

[57] ABSTRACT

A roller electrode combination for use in electric-resistance welders, the electrode having relatively rotatable components separated by very small gaps, and an electrically and thermally conductive liquid is contained by the components across the gaps; the conductive liquid being a gallium dominant composite eutectic mixture where its phase change from liquid to solid begins at possibly 5–8 degrees C. Special controls are provided for the coolant for the roller electrodes, including a sensor to determining its temperature and a heater to preclude its flow through the roller electrode at temperatures below where such phase change might take place. The roller electrodes may be formed of alloys of copper (Cu) and/or a sintered mixture of copper (Cu) and tungsten (W). A protective coating between 0.0025 and 0.025 millimeters thick may be plated on surfaces of the composite copper (Cu) and tungsten (W) roller electrode that come in contact with the conductive liquid. The coating may be of gold and/or of the platinum family, such as rhodium (Rh) and iridium (Ir).

19 Claims, 4 Drawing Sheets

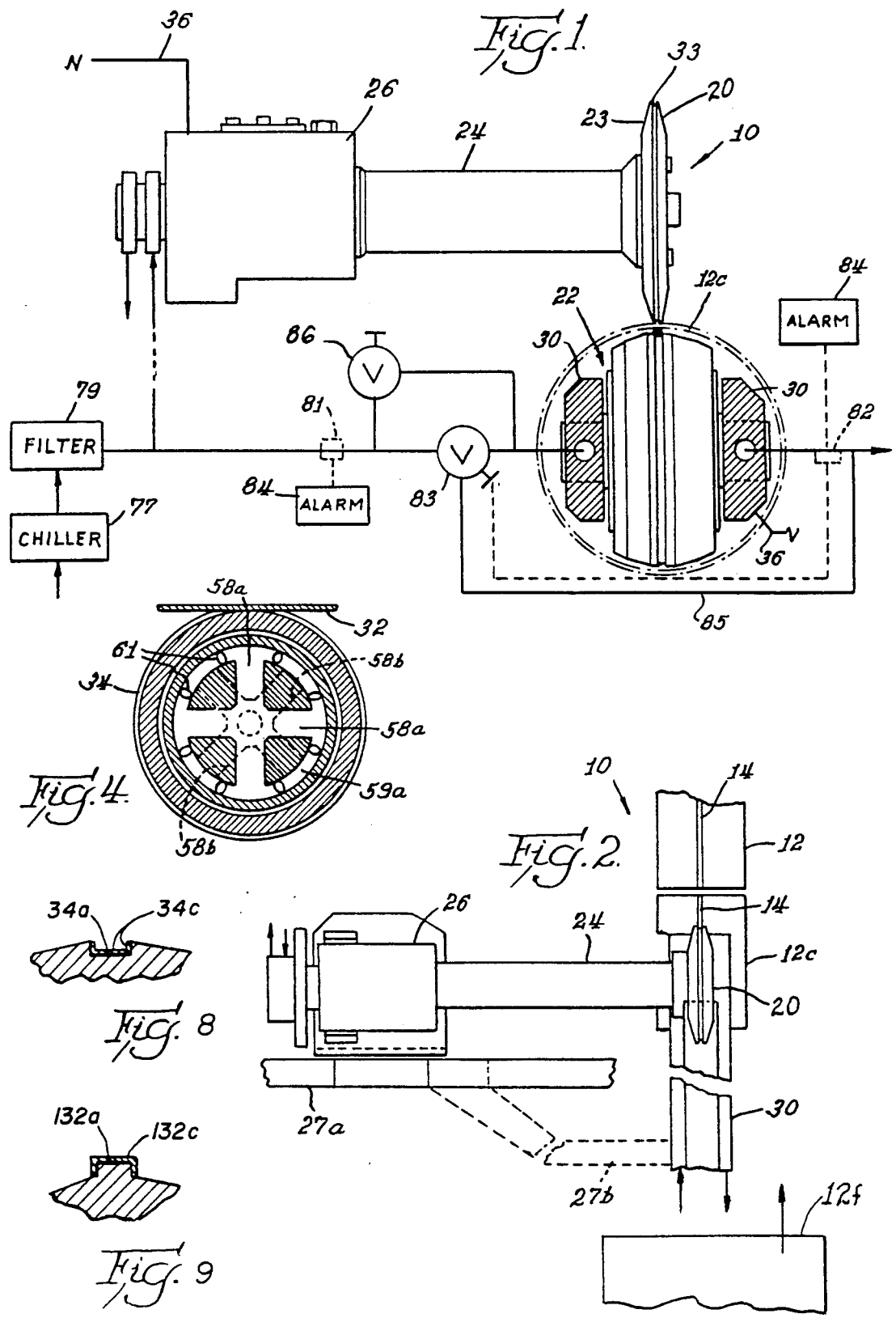

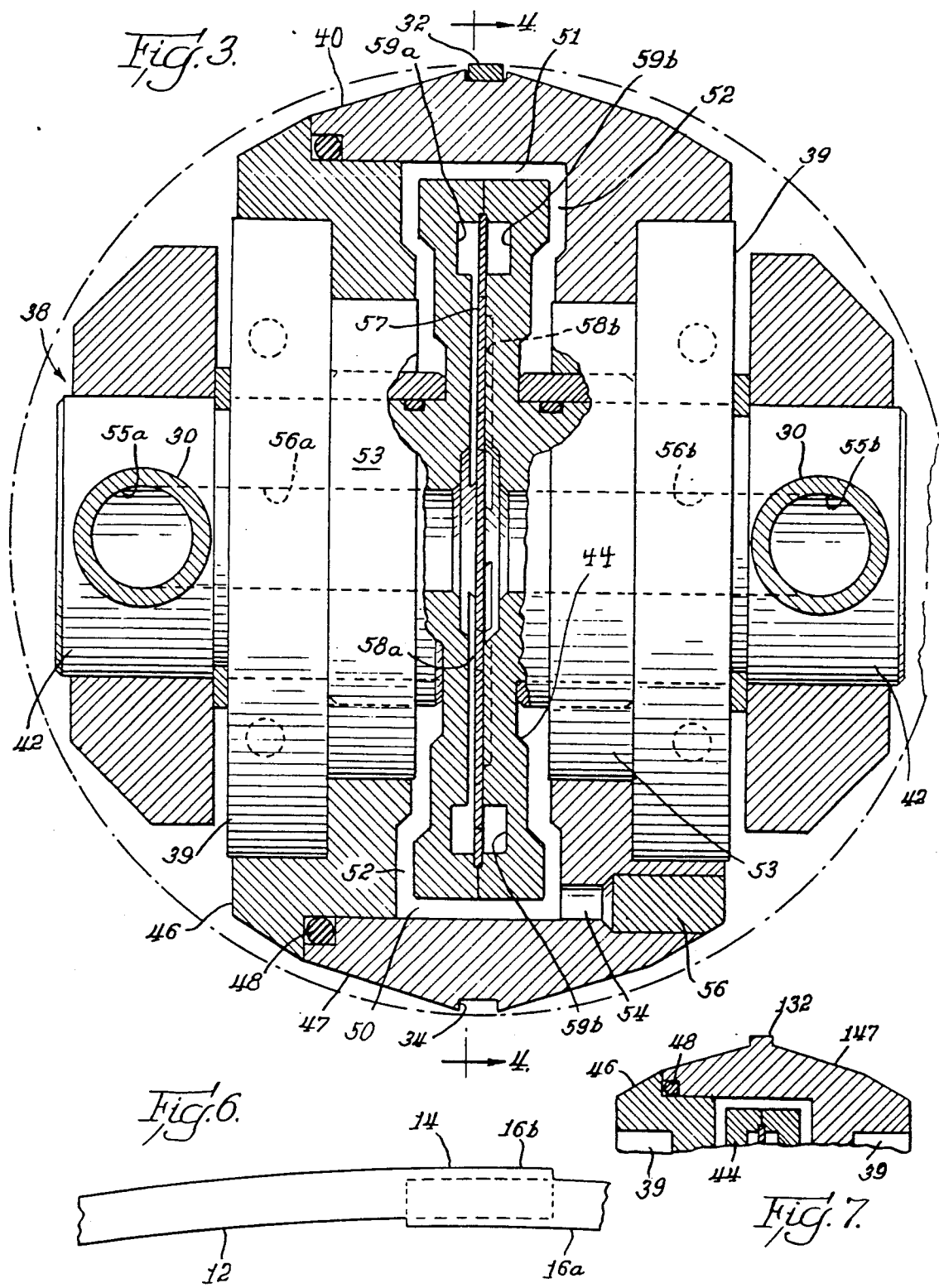

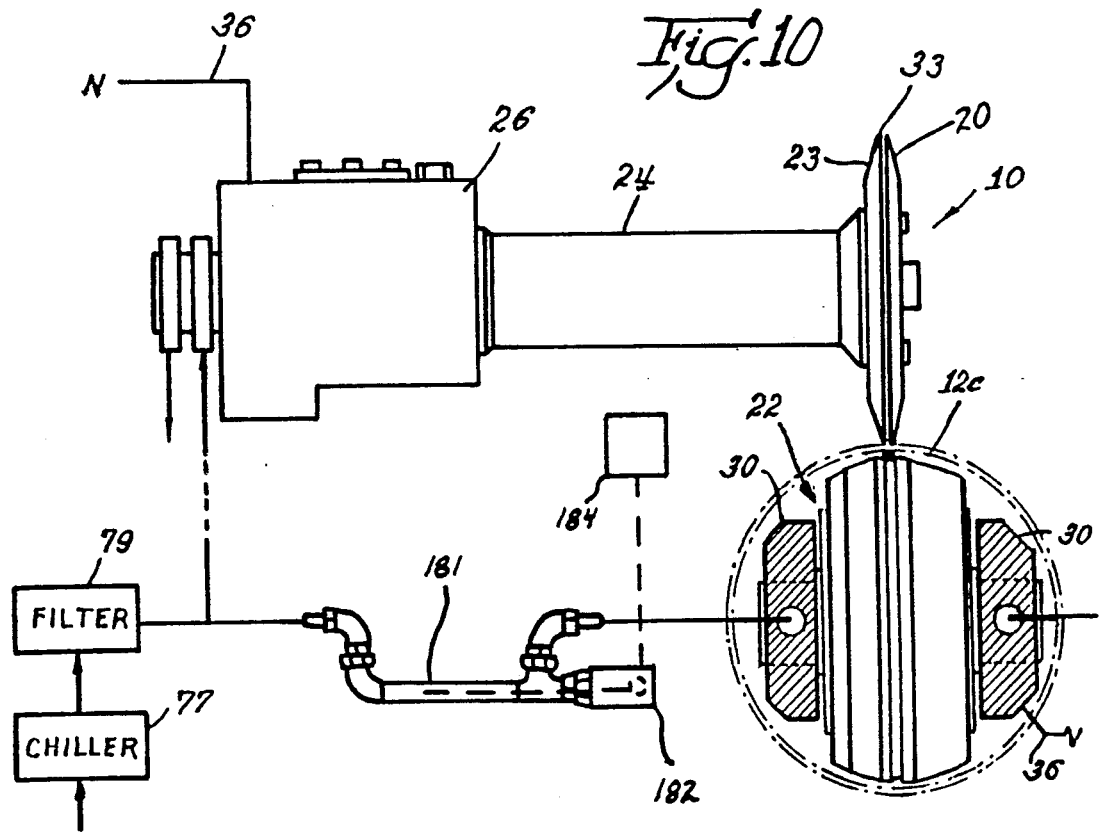

ROLLER ELECTRODES FOR ELECTRIC-RESISTANCE WELDING MACHINE

This application is a continuation-in-part of my copending application filed Mar. 28, 1988, having Ser. No. 173,764, and entitled ROLLER ELECTRODES FOR ELECTRIC-RESISTANCE WELDING MACHINE, and issued as U.S. Pat. No. 4,940,873 on July 10, 1990; which copending application was a continuation-in-part of my application filed May 22, 1987, having Ser. No. 07/053,375, and entitled ROLLER ELECTRODES FOR ELECTRIC-RESISTANCE WELDING MACHINE, and issued as U.S. Pat. No. 4,780,589 on Oct. 25, 1988.

BACKGROUND OF THE INVENTION

Metal cans are fabricated by forming a flat metal blank, usually rectangular in shape, into a tubular configuration with the lateral ends or edges being lapped and welded together, defining a longitudinal seam. End closures are then secured across the open ends of the tubular configuration to complete the can formation. The term "tubular" is not restricted to a circular cross-section, as square or other shaped cans may be fabricated with this same approach. Also, similar continuously welded seams may be used for fabricating structural components other than cans.

One form of seam weld is made as opposed roller electrodes, one on the inside and one on the outside of the tubular configuration, continuously track along in the direction of the lapped ends. A large welding current is transmitted between the roller electrodes, via the small regions of contact defined between the opposing roller electrodes, between and through the lapped ends. The current is pulsed, to provide that the welded seam is actually comprised of a series of "spot welds", made closely adjacent one another.

With a tin-plated steel blank, a copper wire intermediate electrode, typically of rectangular cross-section, is fitted in a circumferential groove on each roller electrode, and pressed then against the opposite sides of the lapped ends. This serves to help carry the melted tin away from the welded seam region; although the tin does tend to solidfy and build up on the roller electrode, and in the groove. Tin buildup increases the electrical resistance (compared to a new roller electrode), and reduces the effective welding current . . . resulting in erractic or even poor welds. This tin buildup periodically can be removed, by machining or "reprofiling" the periphery and groove of the roller electrode. As the roller electrodes must have specific minimum overall diameters and contact angles, reprofiling may be done only a limited number of times; thereafter, the roller electrode must be replaced. The steel blank could alternatively be zinc-coated, but the same buildup problems exist.

One form of inner roller electrode of this type commonly has a stator supported by the welding machine, and a rotor rotatably carried on the stator and having a circumferential guide groove for the copper wire. The rotor and stator are separated from one another by very small radial and circumferential clearance gaps (some possibly only 0.6 of a millimeter wide), across which the relative movement of the rotor and stator takes place. An electrically conductive liquid is sealed in the roller electrode, spanning substantial portions of the gaps, to conduct the welding current between the stator and rotor components. Appropriate bearings and surrounding insulators support relative rotation of the stator and rotor components, but otherwise electrically insulate these components from one another.

One form of roller electrode cooling provides for circulating a coolant liquid, commonly water charged with an anti-freeze, through passages defined in the stator. This cools the stator surfaces exposed to the electrically conductive liquid, and the electrically conductive liquid in turn then also serves to thermally cool the rotor.

The stator and rotor components of the roller electrode are commonly formed of a copper alloy having a high content (possibly 98%) of copper, for yielding high electrical and thermal conductivity. Such an alloy also structurally resists deformation under the welding temperatures and pressures.

Modern welding equipment may weld with 6000 amperes of current at up to 40-50 kilowatts of power, giving a linear welding speed of 70 meters per minute, and yielding a production up to 600 cans per minute.

The electrically and thermally conductive liquid almost universally used in commerical roller electrodes has been mercury. Mercury remains a liquid to approximately $-38$ degrees C., unequaled by any other conductive metal or eutectic mixture of metals, that is also stable at room tempertures. Mercury can carry the high welding currents needed in the roller electrode, and mercury can also provides sufficient cooling for the rotor.

Despite its wide use, mercury has many very poor if not outright dangerous characteristics.

For example, mercury has electrical and thermal conductivities of approximately only 2% that of cooper. The limited wetting ability of mercury adds to the reduced effectiveness of both electrical and thermal transmission between the stator and rotor components. Consequently, its presence: adds appreciably to the electrical current needed to generate the welding temperatures, which raises both the operating temperatures and cooling requirements; and gives off heat to the stator so poorly that the coolant may be heated only a few degrees in passing through the roller electrode, despite being chilled to below room temperature, possibly between 5-15 degrees C. Moreover, the thermal expansion of mercury in the anticipated temperature range of use, 0-100 degrees C., is very large, so that complicated seals and/or overflow devices must be associated with the roller electrodes to accomodate this expansion.

Mercury is also very corrosive to the copper alloy stator and rotor components, producing an amalgam that limits the operating lives of the roller electrode to perhaps only several weeks. The amalgam, in its initial stage is gelatinous or paste-like, to increase drag against electrode rotation; whereas in its more advanced stages, it solidifies rock-hard to bind the components together completely. Once solidified, it is typically impossible to dislodge the amalgam and disassemble the electrode components, such as for rebuilding and salvaging them for a second work cycle. The amalgam has poorer electrical and thermal conductivities than fresh mercury, correspondingly imposing ever higher welding currents and cooling demands.

The roller electrode manufacturer may ship the roller electrodes empty, along with a separate supply of the mercury; and the user must then pour the mercury into the roller electrode and seal it, when the need for using the roller electrode arises.

Toxicity of mercury however, remains probably its most significant drawback, from a liability standpoint. Mercury is frequently looked upon as a substance requiring special standards of care, and government approvals for its wide scale use and disposal. Such restrains detract from the appeal of having the user fill the roller electrode with the mercury and/or add appreciably to the overall costs associated with its use in roller electrodes. Mercury leaks to the enviroment, or even the threat of it, can be unsettling.

Other electrically conductive liquids have been proposed, primarily of a composite gallium dominant eutectic mixture to avoid the above-mentioned problems of mercury. However, such generally have not found commerical application, because the roller electrode had to be modified so much that it would not work in conventional welding machines; or the current carrying capacity of the liquid was inadequate for the high output welding demands.

A basic roller electrode is disclosed in U.S. Pat. No. 3,501,611; non-mercury electrically conductive liquids are disclosed in U.S. Pat. Nos. 4,188,523 (69.5 +or− 5 Atomic % of gallium, 15.2 +or− 1.0 Atomic % indium, 6.1 +or− 1.0 Atomic % tin, 4.5 +or− 0.8 Atomic % zinc, 3.2 +or− 0.5 Atomic % silver, and 1.5 +or− 0.5 Atomic % aluminum, and 4,433,229 (pure gallium, or bianary metals of gallium including gallium-/indium and gallium/tin); and U.S. Pat. No. 4,642,437 disclosed a colbalt coating on the roller electrode. Foreign patents of interest might include West Germany patents Nos. 2,351,534 (Beck); 2,805,345 (Janitzka) and 3,432,499 (Lorenz); Swiss No. 597,971; and Japanese No. 0001583, disclosing different conductive liquids of gallium and/or different overlying coatings on the roller electrode.

My U.S. Pat. No. 4,780,589 provided a substantially nontoxic highly conductive (both electrically and thermally) liquid contained by the components across the very small rotational gaps between the components. The conductive liquid was a composite gallium dominant eutectic mixture of gallium (Ga), indium (In), tin (Sn) and zinc (Zn), having a specific composition, by weight, of approximately 61% Ga, 25% In, 13% Sn, and 1% Zn.

A protective plating on the hotter of the components exposed to the conductive liquid, typically the rotor, further inhibited corrosion and lengthened the operating life. Thus, the rotor surfaces could be plated with a very thin layer of: (1) gold (Ag); (2) rhodium (Rh); or (3) gold first and rhodium over the gold. This plated layer may be on: (1) the hotter rotor surfaces that will be exposed to the conductive liquid, specifically on the inside of the rotor opposite the copper wire electrode, serving to resist corrosion of the rotor; or (2) the hotter exterior rotor surfaces, specifically at the formed groove or trough that would normally guide the copper wire electrode, or at a circumferential rib, formed in place of the groove or trough, that would replace the copper wire electrode, each serving to resist wear of the rotor. Instead of rhodium, other members of the platinum family could also be used, including platinum (Pt), iridium (Ir), palladium (Pd), ruthenium (Ru) or osmium (Os); but reduced conductivity and increased costs may make these alternatives more academic than practical.

My U.S. Pat. No. 4,780,589 also provided a roller electrode having a rotor formed in part of a composite sintered mixture of copper (Cu) and tungsten (W), being in the range of 60% tunsten/40% copper and 70% tunsten/30% copper by weight. This improved rotor provided strength against deformation and mechanical wear, rotor resistance to corrosive attack by the contained conductive liquid, and increased resistance against released tin plate bonding to the rotor, to minimize detrimental tin buildup on the exposed surface of the roller electrode. Other refractory metals, such as molybdenum (Mo) having good electrical conductivity, could also be used instead of tungsten in a composite sintered mixture of copper (Cu) and molybdenum (Mo), particularly when balancing the durability against the costs.

SUMMARY OF THE INVENTION

This invention provides improved controls for the roller electrode cooling circuit used in the electric-resistance welder, including temperature sensor means to determine the temperature of the coolant acurately and quickly, and heater means in an appropriate series flow circuit with the roller electrode coolant, operable (1) to alert the operator that the coolant is operating outside of its proper temperature ranges and/or (2) to heat the coolant automatically to bring it within a set temperature range to preclude damaging the roller electrode caused by the conductive liquid therein being chilled to a phase-change temperature from a liquid to a solid, should the heat balance of the roller electrode not be maintained during nonwelding.

This invention also provides an improved outer roller electrode disc component formed of a composite sintered mixture of copper (Cu) and tungsten (W), being in the range of 60% tunsten/40% copper and 70% tunsten/30% copper by weight. This disc construction improves resistance against (1) deformation and mechanical wear, (2) arcing damage or erosion under the high welding currents, and (3) bonding of released tin plate to minimize detrimental tin buildup on the exposed disc surface of the roller electrode.

The invention moreover provides an improved inner roller electrode formed of a composite sintered mixture of copper (Cu) and tungsten (W), being in the range of 60% tunsten/40% copper and 70% tunsten/30% copper by weight, where a coating of material of the platinum (Pt) family is applied to the rotor in the gap region where it is exposed to the conductive liquid contained between the stator and rotor.

BRIEF DESCRIPTION OF THE DRAWINGS

The disclosure of the present invention includes the accompanying drawings, in which:

FIG. 1 is an elevational-type sectional view of electric-resistance welding equipment, taken generally in a direction axially in line with the formation of a tubular can, and illustrating a can blank in phantom and the inner and outer roller electrodes cooperating therewith;

FIG. 2 is a top plan-type view of FIG. 1;

FIG. 3 is an enlarged sectional view, as seen from the same line of sight as FIG. 1, except through the center of an inner roller electrode used on the electric-resistance welding equipment of FIGS. 1 and 2;

FIG. 4 is a reduced sectional view taken generally from line 4—4 in FIG. 3;

FIG. 6 is a greatly enlarged sectional view, similar to FIG. 1, illustrating the seam weld formed in the mated edges of the can blank;

FIG. 7 is a transverse sectional view of a modified roller electrode;

FIGS. 8 and 9 are greatly enlarged sectional views, similar respectively to portions of FIGS. 3 and 7, illustrating alternative constructions of the rotor; and FIG. 10 is an elevational-type sectional view of electric-resistance welding equipment, similar to FIG. 1, except of an alternate embodiment.

DETAILED DESCRIPTION OF ILLUSTRATED EMBODIMENTS

Figure 5:
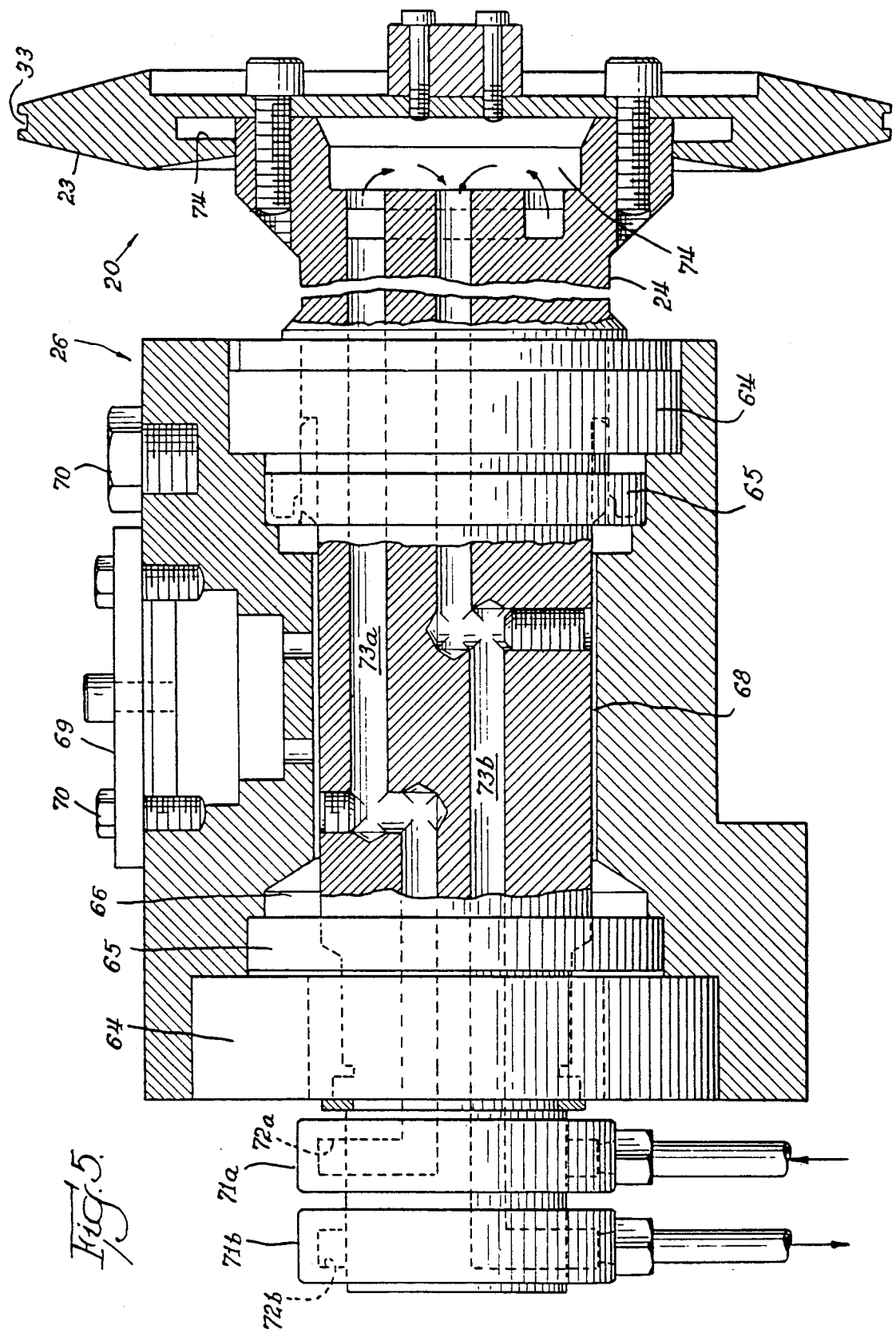
FIG. 5 is an enlarged sectional view, as seen from the same line of sight as FIG. 1, except through the interior of an outer roller electrode used on the electric-resistance welding equipment of FIGS. 1 and 2.

In FIGS. 1 and 2, appropriate roller electrode components of an electric-resistance welder 10 are illustrated, adapted to weld can blanks 12 along longitudinal seams 14, formed where opposite ends 16a and 16b (see FIG. 6) of each blank are overlapped slightly. The can blanks 12 typically will start out flat (as illustrated as 12f in FIG. 2), and will be moved in somewhat spaced edge-to-edge relation, in the direction of the seams 14, and will be reshaped by conventional reforming structure (not shown) to a tubular configuration 12c (shown in phantom only in FIG. 1) with the blank ends overlapped. Outer and inner roller electrodes 20 and 22, respectively identified relative to the tubular configuration 12c of the formed can blank 12, bear against the blank ends at the seam 14.

The outer roller electrode 20 has a disc-like member 23 keyed to an elongated shaft 24, at one end thereof; and the shaft at its opposite end is rotatably mounted at bearing housing 26. The bearing housing 26 is adjustably secured to frame 27a of the welding equipment 10, to orient the shaft 24 substantially perpendicular to the movement of the blanks 12 and the formation of the seams 14. The inner roller electrode 22 is mounted at one end of an elongated arm 30 that extends axially of the movement of the can blanks 12; and the arm 30 at the opposite end is adjustably supported relative to frame 27b of the welding equipment 10, where the blanks are flat or just beginning to be reshaped to be tubular. The inner roller electrode 22 will thus be located at the downstream end of the arm 30, relative to the direction of movement of the blanks 12.

Generally, a copper wire 32 is fitted in each annular groove 33 and 34, respectively formed in the roller electode 20 and 22, to bear directly against the overlapped blank ends 16a and 16b; but only the inner electrode wire 32 received in electrode groove 34 is illustrated in FIGS. 3 and 4. A plused welding current is carried between appropriate conductors 36 (FIG. 1), via the outer roller 20, the sandwiching copper wires 32 and the overlapped can blank ends 16a and 16b, the inner roller 22, and the support arm 30.

FIGS. 3 and 4 illustrate the inner roller electrode 22 in greater detail, the electrode having a stator 38, and a rotor 40 supported by sealed bearings 39 to rotate on the stator 38 about an axis disposed transverse to the arms 30. The stator 38 may be of a unitary construction, including extended ends 42 keyed nonrotatably to the inner roller electrode support arm 30, and a central disc 44 between the extended ends 42. The rotor 40 typically has two adjacent sections 46 and 47 press-fit or otherwise secured together and sealed by O-ring 48 at the overlapping joint.

The joined rotor sections 46 and 47 define a cavity 50 larger than the stator disc 44; and the generally concentric stepped adjacent faces of each are closely spaced from one another across a peripherial gap 51 and opposed side gaps 52. Seals 53 operate between the stator 38 and rotor 40 to seal and electrically insulate these components relative to one another. An electrically and thermally conductively liquid (not shown) fills approximately 80-90% of this sealed roller interior or cavity 50, tap 54 being used for this which is then closed with plug 56. The liguid bridges the gaps 51 and 52 between the stator and rotor; electrically and thermally connecting the stator 42 and rotor 44 together, while allowing relative rotation of these components.

Axially extended coolant passages 55a and 55b formed in the arm 30 communicate with one another via axial, radial and peripherial passages formed in the stator 38. In the roller electrode 22 illustrated, the stator ends 42 have axial passages 56a and 56b extended to opposite sides of a partition 57 fitted in the stator disc, and four radial passages 58a and 58b respectively on opposite sides of the partition extend between the central passages 56a and 56b, and annular passages 59a and 59b on opposite sides of the partition. As illustrated, the four radial passages 58a and 58b on each side of the partition are angled approximately 90 degrees apart; and the passages on one side are angled to lie approximately midway between the passages on the other side. Through openings 61 formed in the partition 57 connects the two annular passages 59a and 59b together, at locations approximately midway between the eight radial passages 58a and 58b.

The housing 26 illustrated in FIG. 5 has sealed bearings 64 and rotary seals 65 that cooperate to rotate the shaft about its longitudinal axis, while sealing the components together against liquid leakage and while electrically insulating the components from one another. The housing cavity 66 is larger than the shaft 24, and generally concentric adjacent faces of each are closely spaced from one another across a peripherial gap 68. An electrically conductively liquid (not shown) fills approximately 80-90% of this sealed housing interior 66, fill cap 69 being used for this and closed by bolts 70. The liguid bridges the peripherial gap 68 between the shaft 24 and housing 26; electrically connecting the components together, while allowing relative rotation between them.

Collar manifolds 71a and 71b are sealed around the shaft 24, at one end thereof adjacent the housing 26, communicating via radial passages 72a and 72b, and axially extended passages 73a and 73b formed in the shaft 24, with passages 74 formed in the disc 23 of the outer roller electrode.

Coolant may be circulated through the outer and inner roller electrodes, for cooling them. As is illustrated in FIGS. 1 and 2, the coolant may be passed through a chiller 77 and a filter 79, and then in parallel through the outer and inner roller electrodes 20 and 22, respectively.

In circulating through the stator 38, the coolant may enter from one passage 55a of the arm 30, pass outwardly in one set of four radial passages 58a to the one annular passage 59a, cross over via the openings 61 to the other annular passage 59b, move inwardly in the other set of four radial passages 58b, and exit via the other passage 55b of the arm 30. The rotor 40 is cooled by the thermal conductivity of the conductive liquid, across the gaps 51 and 52 between the stator disc 44 and rotor. In modern practice, some of the coolant passages in the stator may be of very small cross-section, as small as 1.0 millimeter across; and up to possibly two liters per minute of the coolant may be circulated through these flow passages, representing very high coolant flow velocities.

In circulating through the outer roller electrode 20, the coolant may pass via manifold 71a, shaft passage 73a, disc-like member passage 74, shaft passage 73b and manifold 71b, effectively cooling both the shaft 24 at the conductive liquid gap 68 that carries the welding current and the disc-like member 33 that lies adjacent the actual welding contact region. The exterior housing 26 of the outer roller electrode may also have coolant passages (not shown) to accomodate the circulating coolant, so that the conductive liquid at gap 68 need only carry the electric current between these components and not cool one from the other. In the sense that the disc-like member 23 rolls along the blank edges in making the weld, it might be considered the rotor as might its supporting shaft 24, so that the outer roller electrode housing that surrounds the associated shaft might be considered the stator; which is opposite the inner roller electrode where the rotor surrounds the stator at gaps filled by the conductive liquid.

The electrically and thermally conductive liquid preferred for use in the roller electrode is a composite gallium dominant eutectic mixture of gallium (Ga), indium (In), tin (Sn) and zinc (Zn), having an approximate composition, by weight, of 61% Ga, 25% In, 13% Sn, and 1% Zn. This conductive liquid is essentially nontoxic; has relatively low thermal expansion and low corrosive reaction against copper and/or copper alloys in the anticipated operating temperature range between possibly 5 and 100 degrees C.; has electrical and thermal conductivities almost four times better than mercury, and has much better "wetting" characteristic than mercury; and deteriorates to a putty-like consistency, versus a rock-like consistency of mercury amalgam.

The inner roller electrode 22 is coated, on the inside rotor surface that is to be exposed to the conductive liquid, as a means to reduce corrosive reaction between the conductive liquid and the copper and/or copper alloy structural material of the rotor. Because of the intense heat of the rotor in the rim region opposite the actual welding contact, this region is most critical to corrosive attack of the conductive liquid and should be coated. Because the stator surfaces exposed to the conductive liquid are generally much cooler than any of the rotor surfaces exposed to the conductive liquid, and below the temperatures where the conductive liquid would attack the copper alloy stator, the stator surfaces generally should not be coated.

In one embodiment, gold (Ag) is used, electroplated to a thickness of between 0.0025 and 0.025 of an millimeter. The gold has electrical conductively about 60% that of copper; but the minimum thickness does not appreciable add to the overall resistance of the welding current. Gold improves resistance against corrosive of the disclosed conductive liquid against the copper and/or copper alloy of the rotor; at most operating temperatures of the roller electrode.

In another embodiment, rhodium (Rh) is used, electroplated to a thickness of between 0.0025 and 0.025 of an millimeter. The rhodium has electrical conductively about one-third that of copper; but the minimum thickness does not appreciable add to the overall resistance of the welding current. Rhodium improves resistance against corrosive of the disclosed conductive liquid against the copper and/or copper alloy of the rotor; at even elevated operating temperatures. The rhodium coating also reduces corrosive of conventional mercury against the copper and/or copper alloy of the rotor, making it advantageous to use this rhodium coating even in a conventional mercury-filled roller electrode.

In yet another and preferred embodiment, gold may be electroplated onto the rotor surface, and the rhodium may be electroplated onto the gold. This gold-rhodium combination will tpically be more economical than plating with just gold and/or rhodium, particularly when compared to the overall improved performances. The thickness of gold may be between 0.001 and 0.0125 of a millimeter, and the thichness of rhodium may be slightly less; so that the overall plating may thus possibly be of the order of 0.0015–0.025 of a millimeter thick. As noted, rhodium provides good resistance against any corrosive reaction of the disclosed conductive liguid and/or mercury against the copper alloy rotor.

The roller electrode may be coated also, on the outside rotor surface, as a means to reduce wear of the copper alloy structural material, and/or to reduce buildup of tin or zinc on the rotor periphery.

FIG. 8 shows an enlarged illustration of a roller electrode having the rotor groove 34a, sized and shaped to receive and guide the copper wire electrode 32. The coating 34c would be on the bottom and adjacent sides of the groove 34a. FIG. 9 shows an enlarged illustration of a roller electrode, modified to have the the rotor groove replaced with an annular continuous raised rib 132a. With this embodiment, no copper wire electrode 32 would be used, but the rib 132a itself would ride against the overlapped edges of the can blanks. The coating 132c would be on the top and adjacent sides of the rib 132a.

A preferred coating would be of gold electroplated onto the rotor surface, and rhodium electroplated onto the gold. The thichness of gold may be between 0.001 and 0.0125 of a millimeter, and the thickness of rhodium may be more; so that the overall plating may thus possibly be of the order of 0.0025–0.040 of a millimeter thick. Rhodium may be used alone as an alternative, being electroplated directly onto the rotor surface. Rhodium provides good resistance against mechanical wear of the groove, to increase the operating life of the roller electrode before having to reprofile the rotor periphery, specifically at the annular groove. Rhodium also resists tin and zinc buildup in the groove and/or on the raised rib.

Instead of rhodium, other members of the platinum family may be used, including platinum (Pt), iridium (Ir), palladium (Pd), ruthenium (Ru) or osmium (Os), particularly when balancing conductivity against costs. The protective coating might also be of gold (Au) plated directly on the annular rotor surfaces, rhodium (Rh) plated on the gold, and iridium (Ir) coated on the rhodium. Iridium has the ability to resist corrosion at higher temperatures than either gold or rhodium.

Because the coating, regardless of its composition, has greater resistivity than the copper alloy of the rotor and/or stator component itself, the coating should generally be made only where needed. Also, the rotor of the outer roller electrode may advantageously be coated in the region of the copper wire electrode groove 33 and/or in the region of the continuous raised rib 132a used instead of the copper wire electrode, for increasing resistance against mechanical wear of the groove or raised rib.

To have any disclosed improved roller electrode operate properly for its expected long life, the temperature of the conductive liquid must be extensively regulated. This is done indirectly by regulating the temperatures of the circulating coolant, and by protecting against the buildup of slag and other impurties in the coolant or the oxidation or the like on the walls of the coolant passages . . . all of which lead to reduced cooling, and the possible resultant overheating and greater corrosive activity of the liquid against the components. Thus, a thin coating of silver may be electroplated on or otherwise applied to the walls of the coolant passages, which inhibits the oxidation of the passage walls, particularly where the roller electrode is formed of a copper alloy. The thichness of the silver coating may be between 0.001 and 0.0125 of a millimeter.

On the other hand, excessive cooling can also damage the improved electrode rollers, causing the conductive liquid to change phase at approximately between 8 and 3 degrees C. Excessive cooling is possible if welding may be discontinued over a short length of time, while yet having the chiller and coolant flow continue to operate as if there was no welding stoppage.

As thus illustrated in FIG. 1, the coolant flow to the roller electrodes is from chiller 77 through a filter 79, of possibly 10–50 micron size, to trap out all but the smallest particles that may otherwise block the very small coolant passages of the roller electrodes. Inlet and outlet temperature sensors 81 and 82 are in the coolant flow circuit of the welding equipment, to sense both the safe low inlet and high outlet operating temperatures. As the conductive liquid may start to change phase at temperatures below approximately 8 degrees C., the low safe inlet temperature of the coolant may be set several degrees above this. The safe outlet temperatures of the coolant normally would be in the range of 10–20 degrees C., and the high safe limit may be selected as such. The sensors 81 and 82 may activate an audible and/or visual alarm 84 to advise of either excessive heating or cooling.

The sensor 82 may also activate a variable flow valve 83, to close it and circulate the coolant via line 85 around the roller electrode, responsive to a sensed coolant temperature that may be too cold. A bleed valve 86 may bypass this valve 83, to allow limited flow through the roller electrode even when the valve 83 is closed.

Even with the best known protective coatings on the copper alloy stator and/or rotor components, the conductive liquid will become polluted over time and usage due to the corrosion of these components, and the electrical and thermal conductive capacities of the conductive liquid accordingly will then deteriorate. This means that the welding current must be increased to accomplish the same weld, and the operator of the welder periodically does increases the welding current to help keep the welds somewhat uniform over time. This increased current inputs more heat to the roller electrode, but unfortunately it will be occuring after extended periods of use when the conductive liquid itself has deteriorated to provide reduced cooling effectiveness. This combination will cause the overall roller electrode temperature to rise, which accelerates even more the corrosive activity and deterioration of the conductive liquid.

To help compensate for this, the valve 83 would also have first and second opened positions, allowing different rates of coolant flow through it in such positions. The valve would be initially in the first opened position, which would be sized to allow sufficient coolant flow through it to cool the roller electrode when the conductive liquid is fresh and at both its best thermal and electrical conductivity rates. This flow rate might be between one and one-half and two liters per minute, for example. The sensor 82 would be set to shift the valve 83 to its second opened position, responsive to a predetermined increase in the sensed coolant temperature. The valve in its second opened position would increase the coolant flow rate, to perhaps up to even three liters per minute, for increased cooling capacity; and this would occur automatically when and as the conductive liquid becomes polluted and its conductivity rates drop.

The inner and outer roller electrodes can have parallel coolant flow hookups, or separate controls and flow lines can be provided for each; although for simplicity, only the flow for the inner roller electrode 22 is illustrated.

As has been noted above, excessive cooling has been found to be most damaging to the roller electrode should the conductive liquid contained therein be exposed for any duration to coolant colder than where the conductive liquid changes phase. In-the-field chillers may provide coolant at temperatures near or below this low limit temperatue, which generally is acceptable when welding actually is taking place because of the heat inputted to the roller electrode during welding. However, when welding is terminated for possibly as short a duration as one-half a minute, the tremendous cooling capacity needed to cool the roller electrode may chill the conductive liquid to temperatures lower than that which is acceptable, all quite unintentionally.

This invention also provides improved controls for the coolant system used in the roller electrode circuits of the electric-resistance welder to preclude flow of coolant below a certain set temperature from entering either roller electrode, independently of the incoming coolant temperature and/or of the fact that the electirc resistance welder is actually welding or not.

FIG. 10 shows a heater means 181 and temperature sensor means 182 each in the coolant flow line to the roller electrode. The sensor means 182 is effective to determine the input temperature of the coolant, acurately and quickly; and the heater means is effective responsive thereto to heat the coolant when needed to above the unsafe temperatures of operation of the conductive liquid. The sensor means cutoff temperature may thus be several degrees above 8 degrees C., or perhaps 10 degrees C. A monitor 184 may be provided to indicate the input temperature of the coolant.

To provide sufficient heating capacity, the heating means 181 may have an output of perhaps between 800–1500 watts. As noted above, each roller electrode will have its own heater means 181 and temperature sensor means 182 on its coolant line, although for simplicity of disclosure, only one system is illustrated on the inner roller electrode. The heater means 181 will be located outside of its roller electrode, on the upstream or inlet side thereof in a series flow circuit with the chilled coolant, and typically can be easily installed in the physical structure of the resistance welder by merely cutting the appropriate coolant line and connecting it in place therein. Thus, the heater means is usable without special modifications of either of the roller electrodes; but will preclude possible damage thereto caused by phase change of the conductive liquid in the event welding ceased while coolant flow continued.

Some degree of care is also needed for shipping and/or storing the disclosed roller electrodes, for maintaining the conductive liquid above its lower phase change temperature. Should the disclosed conductive liquid thicken because of being excessively cooled to a gelatinous or slushy condition, the roller electrode frequently may be usable afterwards by warming the conductive liquid back to the liquid phase. However, should the disclosed conductive liquid thicken to a solid because of being excessively cooled, its expansion upon being solidified will almost always blow the seals to reach the bearings; so that the roller electrode generally will fail upon minimal roller electrode use thereafter because of locked bearings.

The rotor may be made of a copper alloy having approximately 0.3–0.7% Beryllium (Be), 1.5–2.0% Nickel (Ni) with the balance Copper (Cu); or up to possibly 0.3% Cobalt (Co) may be added too. This material can be forged and heat treated, whereupon it has sufficient hardness to withstand the temperatures and pressures associated with the rotor; and yet has adequate conductivity. The stator is not subjected to the same temperature and pressure extremes as the rotor, and may be made up of a copper alloy having approximately 1% Chromium (Cr) and the balance Copper (Cu); being much more conductive than, but not as hard as, the rotor material. The rotor and stator materials, and the more conductive liquid, provide less resistance to the electrical current through the roller electrode, to produce less heat and otherwise a better weld, than obtained with a mercury roller electrode and/or an electrode having the stator made of the same material as the rotor.

The rotor pieces 46 and 47 of the inner roller electrode 22 and/or the disc-like member 23 of the outer roller electrode 20 may alternatively be made totally of a sintered mixture of tungsten and copper, of the order of 60% tunsten/40% copper and 70% tunsten/30% copper. As the structural component is unitary in the region between the welding contact and the interior face or passage exposed to the coolant or conductive material, it will have uniform thermal expansion and contraction. The unitary component moreover provides a sure path for the needed thermal and/or electrical conductivity, as contrasted where different pieces of different materials might allow finite separations therebetween, to weaken the component and/or add resistance to both the thermal and electrical conductivity. The unitary component also reliably transmits any needed mechanical torque between the peripherial face and overlapped metal edges.

Of great significance, tin does not bond to or buildup on material of this sintered mixture of tungsten and copper, greatly extending the period between, or possibly even eliminating completely the need for, reprofiling the rotor periphery. The sintered tungsten and copper material has great resistance against corrosion, up to temperatures of the order of 600 degrees C., and also is structurally durable against mechanical wear, approximately four times better than the typical copper alloy rotor. This reduces the mechanical wear of the periphery, where changes of the exterior shape or groove debth adversely reduce the performance and/or operating life of the roller electrode. Although the sintered tungsten and copper mixture has conductivity perhaps one-third less than the conventional copper alloy used for such components, its improved structural properties and the improved conductivity of the disclosed conductive liquid tend to compensate one another. Moreover, this sintered tungsten and copper mixture has provided unexpected field welding results in that arcing between the copper wire electrode and/or the metal blank and the peripheral face or groove has been noticably reduced, thereby reducing the commonly associated spark erosion ocasioned on otherwise existing roller electrodes caused by such arcing.

Both sections 46 and 47 of the rotor must be made of the same material so as to provide uniforn thermal expansion and contraction.

An alternative rotor section 147 (FIG. 7) may be formed of the sintered tungsten-copper mixture and may have a circumferentially continuous raised rib 132 formed on the rotor periphery at a location where the intermediate wire electrode groove (like 34) would be; although this rib need not have any coating. During its use then, the rotor rib 132 would ride against the overlapped edges of the can blank; and no intermediate electrode wire (like 32) would be used between the rotor and the can blank 12.

When using a rotor 22 formed of this composite sintered mixture of copper (Cu) and tungsten (W), being in the range of 60% tunsten/40% copper and 70% tunsten/30% copper by weight, it will be preferred to provide a coating on the inside face thereof that will be in contact with the conductive material. As noted above, this coating may be of gold electroplated onto the rotor surface, and rhodium electroplated onto the gold, with a thichness of gold being between 0.001 and 0.0125 of a millimeter, and the thichness of rhodium being about the same; so that the overall plating may thus possibly be of the order of 0.002–0.0250 of a millimeter thick. Rhodium may be used alone as an alternative, being electroplated directly onto the rotor surface. This coating provides improved resistance to corrosive attack by the contained conductive liquid. Also, the protective coating might be of gold (Au) plated directly on the annular rotor surfaces, rhodium (Rh) plated on the gold, and iridium (Ir) coated on the rhodium. Iridium has the ability to resist corrosion at higher temperatures than either gold or rhodium.

Another aspect of the disclosed roller electrodes is the rebuilding program possible with them, providing for greatly increased overall electrode roller economy. Thus, after the roller electrode has failed, because of a bad bearing or the conductive liquid being polluted to the stage that it is gelatinous or slushy, the components may still be easily disassemblied.

Once separated, the stator and rotor components may be cleaned inside and out, as needed. The component surfaces that were exposed to the conductive liquid may be blasted with glass beads, to clean them without removing component material, or with aluminum oxide for removing the more difficult surface impurities. It has been observed that the conductive liquid does not permanently contaminate the exposed component surfaces, as mercury tends to do, so that they can be cleaned up real good. The coolant passages may be cleaned by flushing with an acetic acid, including with an abrasive such as glass beads or aluminum oxide. Generally, the components are not recoated during this rebuilding program. The cleaned components may be reassemblied with new or rebuilt bearings and seals, and recharged with fresh conductive liquid. The rebuild roller electrode may be reprofiled as needed before being reinstalled on the welder.

While the disclosure has been directed more to the inner roller electrode, it should be appreciated that many of the same inventive aspects will apply equally well to the outer roller electrode.

Some inner roller electrodes 22 of the disclosed design, have operated in-the-field to weld in excess of 34 million cans, on conventional electric resistance welders. Also, the disc-like member 23 formed of the disclosed composite sintered mixture of copper (Cu) and tungsten (W) has operated on a conventional electric resistance welder in-the-field to weld in excess of 75 million cans, needing only three wear-related profilings and without arcing and its associated erosion.

What I claim as my invention is:

1. For use in electric resistance seam welding apparatus having inner and outer roller electrodes opposing one another and sandwiching therebetween overlapped edges of a metal blank curved over a full 360 degrees to a tubular configuration, the combination of the outer roller electrode comprising a member having an exterior peripherial face closely adjacent the overlapped metal edges during welding, passage means in the member adapted to direct a liquid coolant through the member, and the peripherial face and the member in the region radially between said passages and the peripherial face being formed only of a composite sintered mixture of copper (Cu) and tungsten (W), in the range of 60-70% tungsten and 40-30% copper, by weight.

2. A roller electrode combination according to claim 1, further including said peripherial face having an annular groove formed therein to receive and laterally contain a copper wire electrode as the roller electrode rolls along the edges during welding.

3. A roller electrode combination according to claim 1, further including said peripherial face having an annular rib formed thereon raised above said peripherial face, said rib directly engaging the nearer of the overlapped blanks as the roller electrode rolls along the edges during welding.

4. A roller electrode combination according to claim 1, further including the inner roller electrode having stator and rotor components formed with annular surfaces thereon spaced apart across thin gaps, bearing means for mounting said rotor to rotate relative to said stator with movement via said gaps, a conductive liquid simultaneously contacting said annular surfaces to electrically conduct a welding current across said gaps between the components, the rotor having an exterior peripherial face cooperating with the overlapped edges of the blank and said exterior peripherial face being opposite portions of said annular rotor surfaces, the peripherial face, the annular rotor surfaces and the rotor in the region radially therebetween being formed only of a composite sintered mixture of copper (Cu) and tungsten (W), in the range of 6% tunsten/40% copper and 70% tunsten/30% copper, by weight, and a protective coating being formed on the annular rotor surfaces contacting the conductive liquid, said protective coating being of the order between 0.0025 and 0.025 millimeters thick and being of material from the platinum (Pt) family.

5. A roller electrode combination according to claim 4, further wherein said protective coating being of rhodium (Rh) plated directly on the annular rotor surfaces.

6. A roller electrode combination according to claim 4, further wherein said protective coating being of gold (Au) plated directly on the annular rotor surfaces and rhodium (Rh) plated directly on the gold.

7. A roller electrode combination according to clam 4, further including said peripherial face having an annular groove formed therein adapted to receive and laterally contain a copper wire electrode as the roller electrode rolls along the edges during welding.

8. A roller electrode combination according to claim 4, further including said peripherial face having an annular rib formed thereon raised above said peripherial face, said rib directly engaging the nearer of the overlapped blanks as the roller electrode rolls along the edges during welding.

9. A roller electrode combination according to claim 4, further including the stator having passage means therein suited to direct a sufficient volume of a chilled liquid coolant for cooling the roller electrode of heat buildup therein generated by welding, heater means located outside of the inner roller electrode and upstream thereof in a series flow circuit with the chilled coolant, and sensor means operable to activate the heater means for heating the coolant to a temperature several degrees above approximately 5-8 degrees Centigrade, to preclude possible damage to the conductive liquid in the inner roller electrode in the event welding ceased while coolant flow continued.

10. A roller electrode combination according to claim 9, further including the conductive liquid being of a composite eutectic mixture of gallium (Ga), indium (In), tin (Sn) and zinc (Zn), by weight, being substantially 61% Ga, 25% In, 13% Sn, and 1% Zn.

11. An inner roller electrode for use in electric resistance seam welding apparatus having inner and outer roller electrodes opposing one another and sandwiching therebetween overlapped edges of a metal blank curved over a full 360 degrees to a tubular configuration, comprising the combination of the inner roller electrode having stator and rotor components formed with annular surfaces thereon spaced apart across thin gaps, bearing means for mounting said rotor to rotate relative to said stator with movement via said gaps, a conductive liquid simultaneously contacting said annular surfaces and being of a composite eutectic mixture of gallium (Ga), indium (In), tin (Sn) and zinc (Zn) having a safe operating temperature above approximately 5-8 degree Centigrade, the conductive liquid being operable to electrically conduct a welding current across said gaps between the components and to thermally conduct heat across said gaps between the components, the stator having passage means therein suited to direct a sufficient volume of a chilled liquid coolant for cooling the roller electrode of heat buildup therein generated by welding, heater means located outside of the inner roller electrode and upstream thereof in a series flow circuit with the chilled coolant, and sensor means operable to activate the heater means for heating the coolant to a temperature several degrees above approximately 5-8 degrees Centigrade to preclude possible damage to the conductive liquid in the event welding ceased while coolant flow continued.

12. A roller electrode combination according to claim 11, further including silver coating the inside faces of the stator passage means and thereby being adapted to directly contact the chilled liquid coolant.

13. For use in electric resistance seam welding apparatus having roller electrodes opposing one another and sandwiching therebetween overlapped edges of a metal blank curved over a full 360 degrees to a tubular configuration, the inner roller electrode comprising the combination of the inner roller electrode having stator and rotor components, respectively having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components; said rotor having an exterior peripherial face adapted to cooperate with the overlapped edges of the blank and said exterior peripherial face being opposite portions of said annular rotor surfaces, a protective coating being formed on said portions of the annular rotor surfaces, said protective coating being of the order between 0.0025 and 0.025 millimeters thick and being of gold (Au) plated directly on the surfaces of the rotor and rhodium (Rh) plated on the gold; and the outer roller electrode having a disc-like member formed only of a composite sintered mixture of copper (Cu) and tungsten (W), in the range of 60% tunsten/40% copper and 70% tunsten/30% copper, by weight, and having an exterior peripherial face cooperating with the overlapped edges of the blank, opposite the inner roller electrode.

14. A roller electrode for use in electric resistance seam welding apparatus having roller electrodes opposing one another and sandwiching therebetween overlapped edges of a metal blank curved over a full 360 degrees to a tubular configuration, the inner roller electrode comprising the combination of stator and rotor components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, the rotor having an exterior peripherial face adapted to cooperate with the overlapped edges of the blank and said exterior peripherial face being opposite portions of said annular rotor surfaces, the peripherial face, the annular rotor surfaces and the rotor in the region radially therebetween being formed only of a composite sintered mixture of copper (Cu) and tungsten (W), in the range of 60% tunsten/40% copper and 70% tunsten/30% copper, by weight, and a protective coating being formed on the annular rotor surfaces in contact with the conductive liquid, said protective coating being of the order between 0.0025 and 0.025 millimeters thick and being of material from the platinum (Pt) family.

15. A roller electrode combination according to claim 14, further wherein said protective coating being of rhodium (Rh) plated directly on the annular rotor surfaces.

16. A roller electrode combination according to claim 14, further wherein said protective coating being of gold (Au) plated directly on the annular rotor surfaces and rhodium (Rh) plated on the gold.

17. A roller electrode combination according to claim 14, further wherein said protective coating being of gold (Au) plated directly on the annular rotor surfaces and rhodium (Rh) plated on the gold and iridium (Ir) coated on the rhodium.

18. An inner roller electrode for use in electric resistance seam welding apparatus having inner and outer roller electrodes opposing one another and sandwiching therebetween overlapped edges of a metal blank curved over a full 360 degrees to a tubular configuration, the combination comprising stator and rotor components formed with annular surfaces thereon spaced apart across thin gaps, bearing means for mounting said rotor to rotate relative to said stator with movement via said gaps, a conductive liquid simultaneously contacting said annular surfaces to electrically conduct a welding current across said gaps between the components, the rotor having an exterior peripherial face cooperating with the overlapped edges of the blank and said exterior peripherial face being opposite portions of said annular rotor surfaces, the peripherial face, the annular rotor surfaces and the rotor in the region radially therebetween being formed only of a composite sintered mixture of copper (Cu) and tungsten (W), in the range of 60% tunsten/40% copper and 70% tunsten/30% copper, by weight, and a protective coating being formed on the annular rotor surfaces contacting the conductive liquid, said protective coating being of the order between 0.0025 and 0.025 millimeters thick.

19. A roller electrode for use in electric resistance seam welding apparatus having roller electrodes opposing one another and sandwiching therebetween overlapped edges of a metal blank, comprising the combination of the roller electrode having stator and rotor components formed with annular surfaces thereon spaced apart across thin gaps, bearing means for mounting said rotor to rotate relative to said stator with movement via said gaps, a gallium dominant conductive liquid simultaneously contacting said annular surfaces and having a safe operating temperature above approximately 5-8 degrees Centigrade, the conductive liquid electrically conducting a welding current and thermally conducting heat across said gaps between the components, the stator having passage means therein suited to direct a sufficient volume of a chilled liquid coolant for cooling the roller electrode of heat buildup therein generated by welding, heater means located outside of the roller electrode and upstream thereof in a series flow circuit with the chilled coolant, and sensor means operable to activate the heater means for heating the coolant to a temperature several degrees above approximately 5-8 degrees Centigrade to preclude possible damage to the conductive liquid in the event welding ceased while coolant flow continued.

* * * * *